United States Patent
Jin (10) Patent No.: US 11,493,623 B2
(45) Date of Patent: Nov. 8, 2022

(54) DOPPLER GROUP RADAR, GROUP SONAR AND GROUP SENSOR

(71) Applicant: Xin Jin, Waterloo (CA)

(72) Inventor: Xin Jin, Waterloo (CA)

(73) Assignee: Xin Jin, Waterloo (CA)

( * ) Notice: Subject to any disclaimer, the term of this patent is extended or adjusted under 35 U.S.C. 154(b) by 395 days.

(21) Appl. No.: 16/835,278

(22) Filed: Mar. 30, 2020

(65) Prior Publication Data

US 2021/0302565 A1   Sep. 30, 2021

(51) Int. Cl.
| | |
|---|---|
| G01S 11/10 | (2006.01) |
| G01S 13/87 | (2006.01) |
| G01S 15/87 | (2006.01) |
| G01S 19/42 | (2010.01) |
| G01S 11/14 | (2006.01) |
| G01S 1/74 | (2006.01) |
| G01S 1/04 | (2006.01) |

(52) U.S. Cl.
CPC .......... *G01S 13/878* (2013.01); *G01S 1/0428* (2019.08); *G01S 1/753* (2019.08); *G01S 11/10* (2013.01); *G01S 11/14* (2013.01); *G01S 15/876* (2013.01); *G01S 19/42* (2013.01)

(58) Field of Classification Search
CPC ........ G01S 13/878; G01S 11/10; G01S 11/14; G01S 15/876; G01S 19/42
USPC .......................................................... 342/59
See application file for complete search history.

(56) References Cited

U.S. PATENT DOCUMENTS

| | | | | |
|---|---|---|---|---|
| 10,015,769 | B1 * | 7/2018 | Younis | ...................... G01S 5/10 |
| 2007/0229349 | A1 * | 10/2007 | Kajio | ..................... G01S 13/24 |
| | | | | 342/36 |
| 2017/0328995 | A1 * | 11/2017 | Marschalkowski | ..... G01S 13/58 |
| 2022/0187451 | A1 * | 6/2022 | Hustava | .................. G01S 7/524 |

* cited by examiner

Primary Examiner — Harry K Liu (57) ABSTRACT

In many applications such as automobiles on busy highways, if a lot of vehicles on road are equipped with Doppler radars to help improve driving safety, no matter human-driven or auto-driven, if the radars use same frequency band, avoiding interference between them is a hard task. Assigning distinct frequencies is one of the solutions, however not only it wastes expensive spectrum resource, but also the task itself to dynamically assign frequency to vehicles randomly come together becomes a hard one to do. The disclosed invention of Doppler group radar will allow radar devices to work together using shared frequency band without interfering one another, without sacrificing performance, and without much increase in costs.

20 Claims, 8 Drawing Sheets

DOPPLER GROUP RADAR, GROUP SONAR AND GROUP SENSOR

BACKGROUND OF THE INVENTION

Field of the Invention

This invention relates generally to utility of Doppler effect, in particular, to Doppler radars, Doppler sonars and Doppler sensors that may coexist in group with each other or one another.

Description of the Related Art

Doppler effect has been used in Doppler radar, Doppler sonar and generally Doppler sensors to detect moving objects in many applications, including detecting relative speed thereof. When more than one such Doppler sensors work in the vicinity of each other in a same frequency band, detecting errors may occur. For example, when automobiles equipped with Doppler radars drive on a road, a first radar on one vehicle receives reflected waves transmitted from a second radar on another vehicle, the frequency difference between the first and the second radar transmitters will erroneously be confused as Doppler shift and detecting wrong relative speed (refer to FIG. 2). Although techniques such as frequency division, time division, code division, and/or beam division may be used to mitigate the coexistence problem of radar devices, the coordination of their frequency, time, code and/or beam orientation is a difficult task, since the individual automobiles (and their radars) come together on roads randomly. With limited frequency/time/code resources, pre-assigning each radar in the world to a unique frequency, time or code is impossible. Therefore, there is a need in the art to allow a group of Doppler radars, Doppler sonars or Doppler sensors effectively work together using shared frequency.

BRIEF SUMMARY OF THE INVENTION

In one aspect, the invention provides embodiments of a system of Doppler group radar, Doppler group sonar, or wave based Doppler group sensor for sensing objects, comprising radio receiver(s), for receiving broadcasted signal(s) and based on the signal(s) to generate frequency reference signal and timing signal; signal generator(s) for generating a first signal of continuous wave(s) (CW) and/or a second signal of frequency modulated (FM) CW(s) based on the frequency reference signal and/or the timing signal; wave transmitter(s) for transmitting a linear combination of the first and second signals as waves for object sensing; and wave receiver(s) for receiving waves associated with objects under detection, mixing received wave signals with local replica signal(s), and providing mixing product signal(s) for further processing; and any two of the signal generators in the system (no matter at same location or at distinct locations) generate their copies of the first signal identical to each other in frequency properties at any time of operation, and generate their copies of the second signals identical to each other in frequency properties at any time of operation.

In another aspect, at least one embodiment of the invention provides a transmitter apparatus that functions as an active beacon or an illuminator in a system of Doppler group radars, Doppler group sonars, or wave based Doppler group sensors, comprising: a radio receiver, for locking to a broadcasted signal, and deriving, from the broadcasted signal, a frequency reference signal and a timing signal; a signal generator, for generating a first signal and/or a second signal based on the frequency reference signal and/or the timing signal, and building a transmitting signal using the first signal and the second signal; a wave antenna or a wave transducer for converting the transmitting signal into waves and sending the waves into propagation media; any such transmitter apparatus in the system guarantees at any time their first signal and/or their second signal are generated identical in frequency properties with its counterpart generated elsewhere in other devices within the system.

In another aspect, at least one embodiment of the invention provides a wave receiver apparatus, as a stand alone device or a functional subsystem in a device of combined functions, for sensing objects in a system of Doppler group radar, Doppler group sonar or wave based Doppler group sensor, comprising a radio receiver, for locking to a broadcasted signal from an antenna, and deriving, from the broadcasted signal, at least one of a frequency reference signal and a timing signal; a signal generator, coupled with the radio receiver, for generating, based on the at least one of the frequency reference signal and the timing signal, at least one of a first signal and a second signal; one of a wave antenna or a wave transducer, for receiving waves associated with objects under sensing and converting the waves into a wave signal; a receiver frontend, coupled with the one of the wave antenna or the wave transducer, for amplifying and filtering the wave signal, and providing a frontend output signal; a least one mixer, coupled with the receiver frontend and the signal generator, for mixing the frontend output signal with at least one of the first signal, the second signal and a linear combination of the first and the second signals, and producing at least one mixing product signals for further processing; and whereby the receiver apparatus is operable to generate and use, at any time instant of operation, said at least one of the first signal and the second signal identical in frequency properties with counterpart thereof generated elsewhere in other devices within the system of Doppler group radar, Doppler group sonar or wave based Doppler group sensor.

In further yet another aspect, the invention provides a method of determining both relative speeds and ranges (distances) of beacon-attached objects using Doppler group sensor system, comprising steps performed in a wave receiver, of determining Doppler shifts of beacon-attached objects from CW waves; determining frequency shifts of the beacon-attached objects from FM swept waves; identifying object-signal association between the Doppler shifts and the frequency shifts of the beacon-attached objects; determining net frequency shifts caused by wave propagation delay by deducting the Doppler shift results from the frequency shift results; and calculating the ranges of the beacon-attached objects based on the net frequency shifts caused by wave propagation delay; in the processing the wave receiver and the beacons are synchronized apparatuses in the Doppler group sensor system.

Other aspects of the invention will become clear thereafter in the detailed description of the preferred embodiments and the claims.

BRIEF DESCRIPTION OF THE DRAWINGS

For a better understanding of the invention and to show more clearly how it may be carried into effect, reference will now be made, by way of example only, to the accompanying drawings which illustrate distinctive features of at least one exemplary embodiment of the invention, in which:

FIGS. 8A and 8B illustrate another embodiment of a group Doppler radar that may be suitable for use in a highway automobile application, in which FIG. 8A shows block diagram of an illuminator device and FIG. 8B shows block diagram of a radar receiver device;

FIG. 13 shows exemplary spectrum results of FM modulated Doppler group radar using embodiment in FIG. 6 modified according to FIG. 11 and FIG. 12, in which FIG. 13A shows exemplary spectrum results from CW tone path, FIG. 13B shows exemplary spectrum results from sawtooth FM tone path, and FIG. 13C shows processed range detection resulting from FIG. 13A and FIG. 13B;

DETAILED DESCRIPTION OF THE INVENTION

It will be appreciated that in the description herein, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Furthermore, this description is not to be considered as limiting the scope of the invention, but rather as merely providing a particular preferred working embodiment thereof.

In the specification and claims, the terminologies "radar" and "sonar" are used interchangeably, referring to a device that detects or senses objects using waves. The wave used may be electromagnetic wave such as microwave, light wave, or acoustic wave, such as ultrasound, sound wave, or other types of waves. Terminology "sensor" is also used in the specification and claims to refer to devices that detects or senses objects using waves. Although embodiments are described using electromagnetic waves, they are also applicable to other types of waves, and it is understandable by the skilled in the art that, for example, an antenna needs to be replaced by a transducer if acoustic wave is used, and replaced by a light emitter or detector if light wave is used, and so on.

Figure 1:
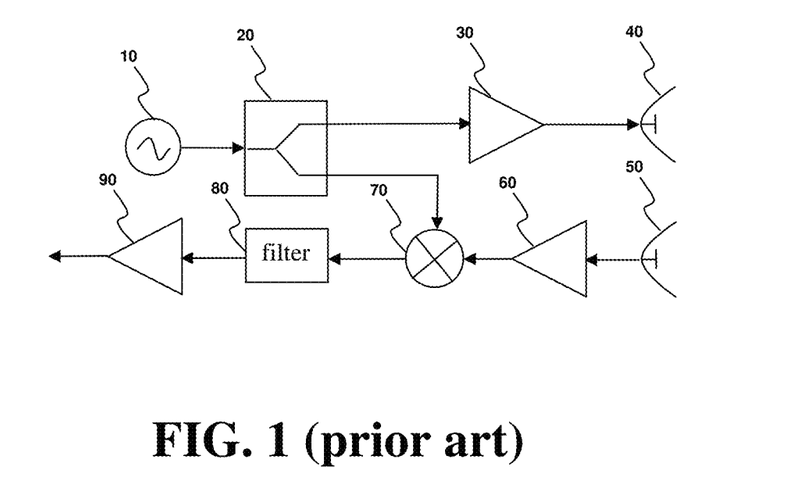
FIG. 1 illustrates a block diagram of a typical Doppler radar (prior art)

A Doppler "group radar" is a family of improved Doppler radar or radars that are suitable to work together in vicinity of each other. To explain how Doppler group radars work and how Doppler group radars are built, we first review the prior art, a conventional Doppler radar. As illustrated in FIG. 1, a block diagram of typical embodiment of a conventional Doppler radar (prior art) is shown. This Doppler radar system includes a CW (continuous wave) signal generator 10, which may be implemented using a crystal oscillator, a frequency synthesizer that locks to a reference oscillator built-in the device (not shown in drawing), or other types of CW generator. For purpose of Doppler detection, the CW generator preferably creates low phase noise, which is a type of random (unpredictable) phase modulation in the CW signal. The CW signal is fed to a splitter 20 to create two branches of signals that are identical to each other except that they may be different in amplitude and static phase shift. One branch of the split signal is amplified through a power amplifier 30 and sent to a transmitting antenna 40. The electromagnetic wave of the CW signal is transmitted into space towards objects under detection (not shown in drawing) and bounces back to a receiving antenna 50, amplified by an amplifier 60, usually referred to in the art as a low noise amplifier (LNA) and preferably the amplifier also includes tuning circuit to suppress unwanted signals outside the signal band of the radar. The amplified signal is then mixed with the other branch of CW signal from the splitter 20 at a mixer 70 to be down converted to base band, which is also referred to in the art as IF (intermediate frequency) or zero IF (zero intermediate frequency), or baseband (in one word). Preferably the mixer is a quadrature mixer that produces both in-phase and quadrature baseband signals. The baseband signal(s) will next be filtered by a filter 80 to remove components in $2^{nd}$ (and higher) harmonic bands, also remove noises and interferences above the maximum Doppler shifts of interests in the application. In same applications the filter 80 may also block DC and close to DC components that represent signals bounced back from objects with zero speed relative to the antennas 50 and 40, i.e., the (relatively) "stationary" objects. An amplifier 90 bring the signal to desired level for further processing, usually including (not shown in drawing) analog to digital converter and DSP (digital signal processing or processor).

People skilled in the art understand that, if an object is moving towards the antennas 40 and 50 at a speed v, the signal bounced back from the object and seen at the receiving antenna 50 would exhibit a higher frequency than that of the CW signal at the transmitting antenna 40, by an amount referred to as Doppler shift, which is $|fd|=2 fv/(c-v)$, where f is the frequency of the transmitted CW signal; c is the wave traveling speed; for electromagnetic wave, c is also referred to speed of light which is about $3\times10^8$ m/s in free space (vacuum) and in air; if an object is moving away from the antennas 40 and 50 at a speed v, the signal bounced back from the object and seen at the receiving antenna 50 would exhibit a lower frequency than that of the CW signal at the transmitting antenna 40, by the amount of |fd|=2fv/(c+v). If the Doppler sensor is a sonar device using acoustic waves, the block diagram would need to replace the antennas 40 and 50 by sound transducers (also referred to as speaker and microphone), and the wave speed c needs to be replaced by speed of acoustic wave, about 343 m/s in air and 1481 m/s in water.

The Doppler shift+/−fd will cause the output signals of mixer 70 to be at frequency+/−fd. From this signal frequency fd, moving objects and moving speed thereof can be detected and derived. A positive fd means the object is approaching the radar, and a negative fd means the object is leaving the radar. The higher the |fd|, the higher the target speed is.

Figure 2:
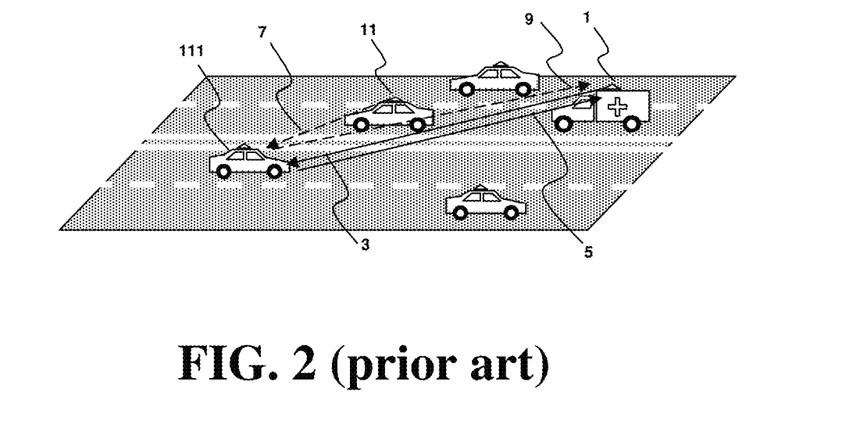
FIG. 2 illustrates an example that a plurality of Doppler radars interfere with each other in an automobile application (prior art)

What happens if a plurality of such conventional Doppler radar devices work in a same frequency band and in the vicinity of each other? Referring to an exemplary scenario as shown in FIG. 2, assuming a Doppler radar device installed on vehicle 1 transmits at frequency f1, and another Doppler radar device installed on vehicle 11 transmits at frequency f2, and f2−f1=fe to be the frequency difference of the two radar transmitters. The radar signal 3 from the radar on vehicle 1 hits an object vehicle 111 and bounces back (signal 5 in drawing) to the radar receiver on vehicle 1 and exhibits a Doppler shift fd, which is dependent on relative speed between vehicle 1 and vehicle 111 as expected. Meanwhile radar signal 7 from the radar on vehicle 11 also hits the object vehicle 111 and bounces not only back to the radar on vehicle 11 as intended but also to the radar receiver on vehicle 1 (signal 9 in drawing). The frequency of received signal 9 at radar receiver on vehicle 1 depends not only on relative speed between vehicle 1 and vehicle 111, but also depends on relative speeds between vehicle 11 and vehicle 111, and further more, it also adds the frequency difference fe. Signals from a single object (vehicle 111) will be detected as two objects on the radar of vehicle 1, one is the true detection with relative speed as can be calculated from fd, another is a false detection with erroneously derived relative speed depending on fe, as well as speed of vehicle 11 which is irrelevant to the relative speed between the intended object vehicle 111 and the radar device (vehicle 1).

Figure 3:
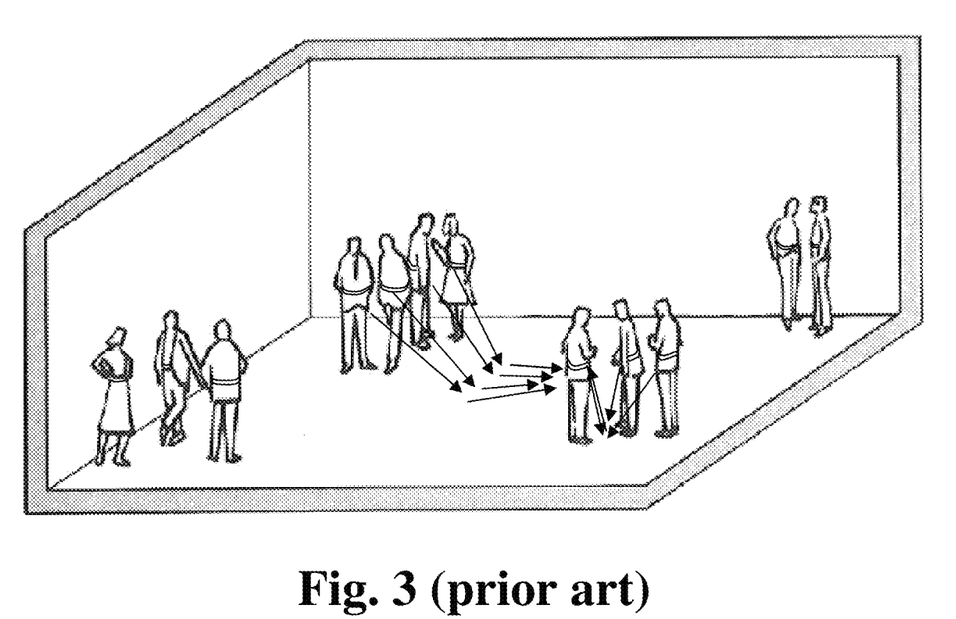
FIG. 3 illustrates an example a plurality of Doppler radars interfere with each other in an application of personal wearable protective device (prior art)

FIG. 3 shows an exemplary application scenario of Doppler radars on personal wearable protective device, such as that disclosed in U.S. Pat. No. 10,154,695 B2, in which Doppler radars or sonars are utilized in wearable devices that are carried by old adults to detect falling prior to hitting floor or objects, and deploy protective air bags to prevent injuries. In some use cases as shown in the figure, people carrying such devices may gather together and the Doppler radars must work in the vicinity of other identical or similar Doppler radar devices. Assuming a first person wearing a Doppler transmitting signal at frequency f1, if the person is not falling, this signal bounces back from the floor and many other stationary or slow moving objects will exhibit zero or very low Doppler shifts. If other surrounding radar devices each transmits at their own free running frequencies slightly higher or lower than f1 by non-zero amounts Δf1, Δf2, . . . , Δfn, . . . . These signals either bouncing back from objects or directly coming to the radar receiver of the first person, the radar detected Doppler shifts of these signals will be added by these amounts Δf1, Δf2, . . . , Δfn, . . . and they are likely to confuse the radar to detect a false falling. In other words, such Doppler radar will work in detecting falling if deployed alone, but will have trouble if deployed in a group together.

Now we explain how a Doppler group radar device or a Doppler group radar system is built and how it will avoid the problem as described above, by way of example through embodiments.

Figure 4:
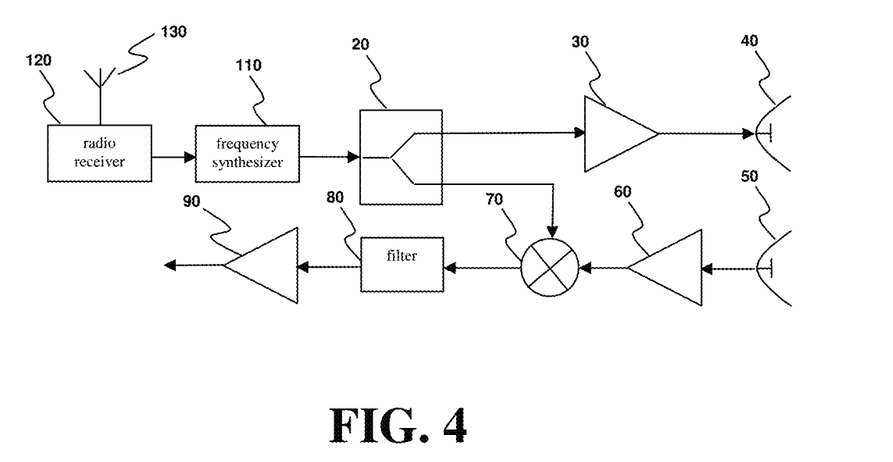
FIG. 4 illustrates a block diagram of one embodiment of Doppler group radar.

Referring to FIG. 4, which depicts a block diagram of an embodiment of Doppler group radar suitable to coexist with other Doppler group radar devices of this kind. In the figure, the functions of the elements 20, 30, 40, 50, 60, 70, 80 and 90 are identical to the corresponding ones in FIG. 1 that are marked with same numerals. The radio receiver 120 and the antenna 130 are used to receive, over the air, a signal or signals that will be explained in more detail in next a few paragraphs, and by successfully acquiring and phase locking or frequency locking to the signal(s), produces a reference frequency signal and output it to the frequency synthesizer 110. Deriving from the reference signal frequency, the frequency synthesizer 110 then generates a CW signal at a desired frequency for the radar. All Doppler group radar devices of same frequency band that work together in an area are required to transmit at an exactly same frequency. This can be achieved by 1) locking (in frequency or phase) to a same radio signal, 2) locking to signals that are locked with each other in their generation process, or 3) locked to high precision independent frequency standard sources, such as atomic clock. As shown in FIG. 4, methods 1) or 2) is used. Method 3 may be too expensive to use today (but may be possible someday in future).

In one preferred embodiment, the radio receiver 120 acquires and locks to GNSS satellite signals, e.g., GPS, GLONASS, Beidou, Galileo, or the kind. As known in the art, all these GNSS signals come from precision frequency source of atomic clocks. Although movements of satellites causing signals received at antenna 130 to exhibit significant Doppler shifts, since the GNSS simultaneously broadcasts orbit data that can accurately derive and correct these shifts after a "position fix" is achieved, there has been matured technology to generate accurate reference clock based on GNSS, known in the art as GNSS disciplined oscillator.

In another embodiment, the radio receiver 120 may acquire and lock to ground station signal(s) of standard frequency and time signal service (SFTS) such as defined in Article 1.53 of the International Telecommunication Union's (ITU) Radio Regulations (RR), or space station signals of standard frequency and time signal-satellite service (SFTSS) such as defined in Article 1.54 of ITU RR.

In yet another embodiment, all coexisting member devices of Doppler group radars may acquire and lock to a commonly agreed radio signal. This radio signal may be originally for purpose of other services. This signal does not have to provide an absolute accuracy of frequency, but ensures frequency synchronization among all coexisting member devices of the group radars. For example, the devices may all lock to the carrier of an AM radio station, a TV station, or a cellular base station, etc. A protocol needs to be in place to ensure member devices will correctly identify, among potentially many broadcasted signals, which one of them they all lock to. One simple example is a lookup table of signals ordered by priority. Such lookup table may also list only one signal to use.

In an alternative embodiment, in applications such as that shown in FIG. 3, in which users of Doppler group radar are stationary or quasi-stationary, an autonomous procedure may be performed to make all users in a cluster synchronized and make the group radar work. The procedure needs to pick one of the member devices (referred to as leader) in a group radar cluster to transmit a reference signal and all other member devices are synchronized with is this reference signal (referred to hereinafter as leader reference signal). The leader reference signal may be transmitted using a separate dedicated antenna (not shown in drawing, e.g. an omnidirectional antenna) and/or in a separate dedicated channel (not shown in drawing). The leader reference signal must have a predetermined frequency relationship with the radar wave signal (at antennas 40) that is known to all member devices.

In another preferred embodiment, regional special purpose transmitter stations, referred to, in this application, as reference broadcast stations, are built to serve local Doppler group radar users in the region. These special purpose stations will broadcast predefined frequency reference signals authorized by radio spectrum regulation authorities and follow commonly agreed standard. All member devices of Doppler group radar are required to synchronize with at least one of the reference signals broadcast by a reference station and follow a commonly agreed standard in deriving their transmit frequency from the reference signal. Preferably the reference broadcast stations also broadcast a time mark signal and station geometric position information, for example, in terms of Latitude and longitude as well as altitude. The geometric position information of the station may be used for correcting Doppler shift of the frequency reference signal as seen at receiver radio 120, caused by movement of the radio receiver 120. More preferably, multiple such stations are deployed around serving region and each device of a Doppler group radar system will receive 3 or more such signals from multiple directions. In such condition, even if the device is moving, based on timing mark and geometrical location information broadcasted, the device is able to accurately correct Doppler shifts in received reference broadcast signals.

When Doppler Radar devices as in FIG. 4 are all synchronized and deployed in application scenario of FIG. 3, what will happen? Assuming a first person wearing a Doppler transmitting signal at frequency f1, if the person is not falling, this signal bounces back from the floor and many other stationary or slow moving objects will exhibit zero or very low Doppler shifts, which will cause the mixer 70 to output a DC and very low frequency fluctuations, and they will be blocked by the filter 80. As other surrounding radar devices are all synchronized, each of them also transmits at the frequency equal to f1 with only very small phase noise (random frequency drifts). These signals, either bouncing back from stationary objects and slow-moving persons, or line of sight directly coming to the radar receiver of the first person, if the radar receiver of the first person has sufficient dynamic range to handle stronger signals coming through line of sight paths, the radar detected Doppler shifts of these signals will also be zero or very low frequency and will be blocked as well by filter 80. Only when the person falls and the fast moving will get high Doppler shifts be detected. It is true, however, when a second person falls, who is close to the first person, the radar device wearing on the first person may also detects a falling. In other words, for the application scenario of FIG. 3, the synchronized radars of FIG. 4 do work, in most cases except, by chances, the special cases as will be explained in the next paragraph.

Since all member devices in a cluster are synchronized, their signals are coherent with each other. By chances, a wanted signal, from a member radar transmitter and bouncing back from an object under detection, may arrive at its receiving antenna 50 in destructive phase (about 180 degrees) and similar magnitude with another signal (line-of-sight directly or indirectly after being reflected) from a transmitter of another member device. When such chances happen, the detection may fail. Such chance is very low since Doppler radars do not care missing signals bounced from stationary objects, and an interfering signal happens to have nearly same Doppler shift and out of phase, as seen at given receiver antenna, is very unlikely. To further reduce such failing chances, an improved embodiment will be described in the next paragraph.

Figure 5:
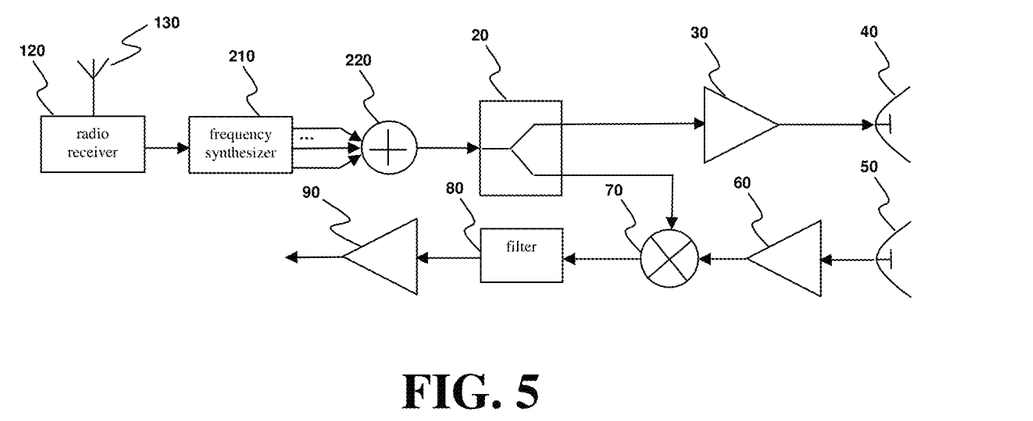
FIG. 5 is a block diagram of another embodiment of Doppler group radar.

FIG. 5 is another preferred embodiment of Doppler group radar, suitable to coexist with other Doppler group radars of this kind. In the figure, the functions of the elements of 120, 130, 20, 30, 40, 50, 60, 70, 80 and 90 are identical to the corresponding ones in FIG. 4 that are marked with same numerals. The frequency synthesizer 210 is modified to produce more than one outputs, and the output signals are linearly combined in adder 220. The output signals of synthesizer 210 each has distinct CW frequency and the frequency difference between any pair of them shall be more than the maximum Doppler shift of concern in the application plus a guard band. This way, between them they will not interfere with each other. Furthermore, it is desirable that any of the frequency of synthesizer 210 output shall be away from n times of another frequency of synthesizer 210 output by at least amount of n times [maximum Doppler of concern plus guard band]. It can be understood by skilled people in the art that the radar in FIG. 5 simultaneous transmit multiple tones and detection can be achieved through any frequency component of the tones. As a member of Doppler group radar cluster, each radar device shall transmit at a number of frequencies that are pre-agreed among the members of the cluster. As such, all devices are synchronized in their transmitting frequencies without being confused as Doppler shift. It can also be understood by those skilled in the art that, the chance of multiple tones all happen to simultaneously cancel each other between users is very minimal. As cancelling tones must happen to have nearly same Doppler shift, in practice, duel tones would be sufficient in typical applications. As can be realized by the skilled in the art, the embodiment in FIG. 4 is a degeneration special case of the embodiment in FIG. 5.

Figure 6:
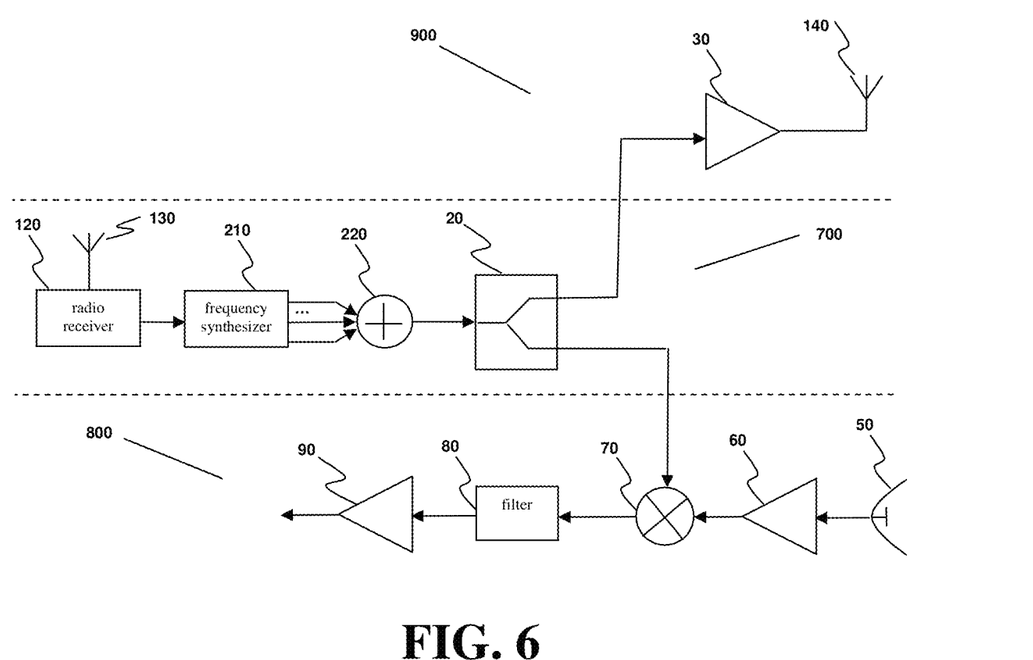
FIG. 6 shows a block diagrams of yet another preferred embodiment of Doppler group radar device, a combined device of "active beacon" and radar receiver which plays both an "active beacon" function and a radar receiver function in a system.

FIG. 6 shows a block diagram of another preferred embodiment of Doppler group radar device, wherein the upper part 900 is the "active beacon" part of the radar device and the lower part 800 is the receiver part of the radar device, whereas the middle part 700 is the common part shared by the radio beacon function and receiver function. This embodiment may be used in an automobile application and fully-automated (unmanned) cargo terminal application, for example. The active beacon part, 900 together with 700, transmits a beacon signal for purpose of being seen. In an automobile application, this part is desirable to be installed on every vehicle on road that supports such feature. Like a lighthouse, the beacon signal is for purpose of letting others "see" it rather than illuminating objects sounding it. The radar receiver part, 800 together with 700, detects and measures signals coming from active beacons of other devices (installed on other vehicles, for example).

The active beacon part 700 and 900 actually is nearly identical to the transmitting path in FIG. 5, except that antenna 140 may be desirable to be replaced by an omnidirectional antenna. That is because the beacon, in many applications, is desired to be seen by (other) radars from any direction around. As in previous embodiments, the transmitting frequency will be frequency (or phase) locked so that all beacons in a cluster of beacon devices transmit at identical frequency or frequencies. Again, it is desirable to transmit at more than one frequency simultaneously to reduce the chance that signals from two radio beacons in cluster arrive at a radar receiver antenna to happen to cancel each other and causing misdetection.

The receiver part 700 and 800 in fact is identical to the receiving path in previous embodiments (FIG. 5), however, in this embodiment, the receiver is intended to detects signal coming directly from (other) radio beacons rather than detecting the signals bounced from passive objects. For typical objects like cars, a reflected path usually is weaker than a line-of-sight direct path by 15 dB or more, gain of the receiver path in FIG. 6 is desirably optimized for ling-of-sight signal strengths for the detection range in design. Since every active beacon is synchronized and transmits at an identical frequency (or a sets of identical frequencies), a radar receiver will observe Doppler shifts from any of them only dependent on the relative speed between a beacon under detection and the receiver, not depending on factors such as frequency error and drifts and moving speed of any other objects around. Again, a misdetection may happen if signals from two beacons happen to exhibit nearly identical Doppler shift amount and out of phase when arriving at antenna 50. The method to reduce such chances of misdetection is again to simultaneously use more than one tone frequencies for detection as explained in previous embodiment of FIG. 5. People ordinarily skilled in the art will be able to derive Doppler and speed relations in such beacon and receiver use case base on principles of Doppler effects, and will not be detailed herein.

Figure 7:
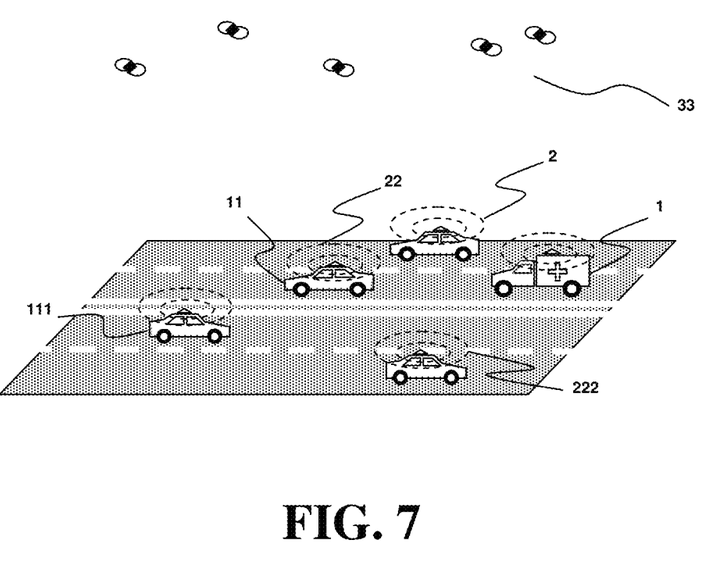
FIG. 7 illustrates an exemplary automobile application scenario of a Doppler group radar system using the device embodiment of FIG. 6.

FIG. 7 illustrates an exemplary automobile application scenario of a Doppler group radar system using the device embodiment of FIG. 6. In the example, all vehicles on road (such as 1, 11, 111, and so on) are equipped with active beacons that transmit a beacon signal (2, 22 or 222 and so on) of a tone (or a set of tones) at precisely an identical frequency (or an identical set of frequencies), this is achieved by using their built-in receiver (not shown in drawing) to lock to navigation signals from GNSS 33 and condition their built-in local oscillators (not shown in drawing). Radar receivers, also equipped with by the vehicles (such as 1, 11, 111, and so on) then detect the beacon signals and measure their Doppler shifts. Since a beacon tone only requires spectrum band of plus/minus maximum Doppler shifts around a tone frequency plus a guard gap on each side, and all devices share a same frequency or share a couple of frequencies for multi-tones, required spectrum for the Doppler group radar is very minimal.

Figure 8A:
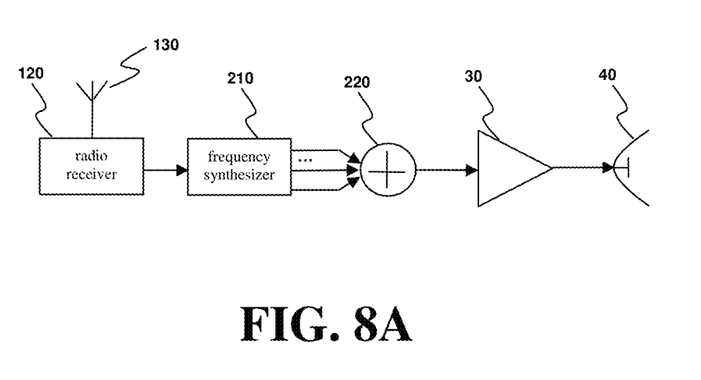
Figure 8B:
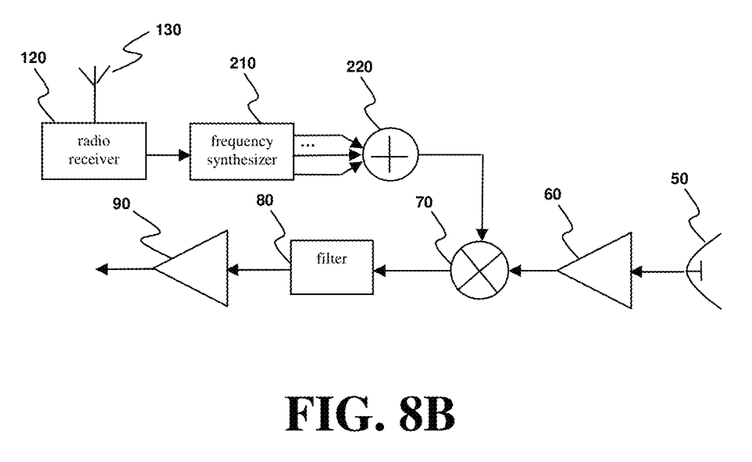

FIGS. 8A and 8B illustrate another embodiment of Doppler group radar devices that make the system maybe suitable for use in highway automobile application where new type of vehicles equipped with beacons and old vehicles without beacons are mixed in traffic. In particular, FIG. 8A shows an illuminator device and FIG. 8B shows a radar receiver device.

Referring now to FIG. 8A, block diagram of illuminator device of the Doppler group radar system in the preferred embodiment. In the block diagram, elements of 120, 130, 210, 220, 30 and 40 are identical to the corresponding ones in FIG. 5 with same numerals. Comparing it with transmitter path of FIG. 5, only splitter 20 is eliminated in FIG. 8A and the rest are identical to the transmitter path in FIG. 5. The illuminator devices are installed on stationary platforms to radiate CW tone (or tones) to objects under radar detection so that the signals bouncing back from these objects will be detected by radar receivers, which may be separately installed on board of moving platforms (such as cars and cargo vehicles). Again, all illuminator devices transmit one tone or a number of tones at precisely identical frequency or frequencies, so that frequency differences (of corresponding tone signals) between all illuminator devices are zero and will not be erroneously detected as a Doppler shift. Also again, as did in the embodiment of FIG. 5, more than one tones may be transmitted simultaneously to illuminate objects under detection, so as to reduce chances of misdetections caused by tone signals coming from two illuminators (bounced by objects or directly through line-of-sight path) happen to arrive at a receiver nearly out of phase and happens to exhibit nearly identical Doppler shift.

Referring now to FIG. 8B, block diagram of receiver device of the Doppler group radar system in the preferred embodiment. In the block diagram, elements of 120, 130, 210, 220, 50, 60, 70, 80, and 90 are identical to the corresponding ones in FIG. 5 with same numerals. Comparing it with the portion of FIG. 5 related to receiver, only splitter 20 is eliminated in FIG. 8B and the rest are identical to the portion in FIG. 5. The radar receiver devices may be installed on board of moving platforms (such as cars and cargo vehicles) to detect reflected signals from objects under detection. These reflected signals originally come from illuminators which may be installed physically away from the receivers. Again the detection may be simultaneously performed at more than one CW tone frequencies to reduce chances of misdetection caused by multipath/multisource cancellation as explained also in previous embodiments. People ordinarily skilled in that art will be able to derive Doppler and speed relations in such stationary illuminator and moving receiver use case base on principles of Doppler effects, and will not be detailed herein.

Figure 9:
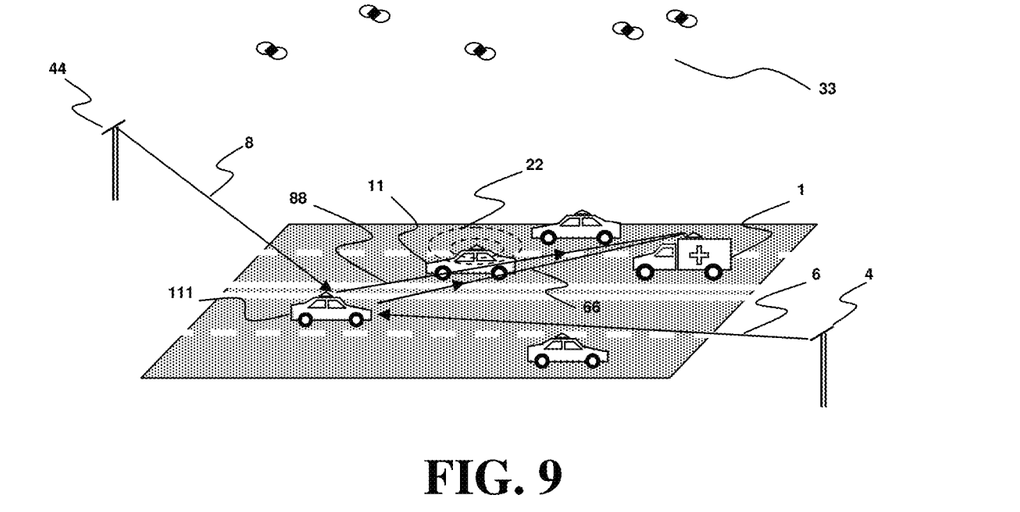
FIG. 9 illustrates an exemplary use case of embodiment of FIGS. 8A and 8B.

FIG. 9 illustrates an exemplary use case of embodiment of FIGS. 8A and 8B, in highway automobile application. Illuminators (such as built by way of FIG. 8A) are installed on roadside towers (e.g., 4 and 44 in drawing) or above road structures (not shown in drawing) along the highway, which may lock to signals from GNSS 33 and produce CW tone (or tones) identical in frequency (or frequencies) and transmit towards automobiles on road (e.g., signal paths 6 and 8 shown in drawing). The signals hit an automobile (e.g. vehicle 111) and are reflected to the air, such as signal paths shown in drawing 66 and 88, they are received by radar receivers installed on board of vehicles (e.g. that on vehicle 1), the radar receivers may be built by way of FIG. 8B and they may also be locked to GNSS signals from GNSS satellites 33. Receiving the reflected signals (e.g. 66 and 88), the receiver is able to detect the Doppler shift of the signals. On the road, there may be mixed type of vehicle objects, some of them (e.g. vehicle 11) may be equipped with an active beacon signal transmitter as described in FIG. 6, sending in air a beacon signal 22, an radar receiver such as that on board of vehicle 1 should also be able to detect the beacon signal since they shall be at same CW frequency as what the illuminators transmit. For purpose of reliable detection of both reflected signals and actively transmitted active beacon signals, the beacon transmitted power is desirably regulated to similar levels as the reflected signal power to optimize radar receiver link budget. Alternatively, the active beacons may be assigned a frequency (or a set of frequencies) different from what the illuminators use, and a radar receiver is designed to receive signal frequencies of both type of signals. In the drawing although it illustrated only one radar receiver on vehicle 1 detecting signals, in fact every vehicle may be equipped with an radar receiver and they should work in the same way as that on vehicle 1. They form a group radar cluster without interfering with each other although on same frequency or frequencies.

It is known in the art that using frequency modulated signal to replace CW would enable a Doppler radar to detect not only object speed but also object range (distance). The Doppler group radar disclosed herein is also able to incorporate that technology, as will be described herein below.

Figure 10:
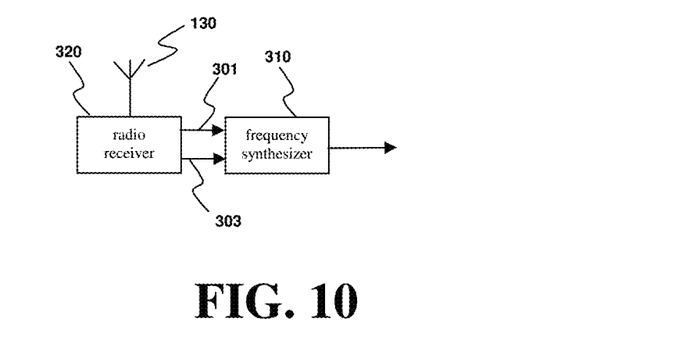
FIG. 10 shows modifications to the embodiment in FIG. 4 to make it an embodiment of FM modulated Doppler group radar.

Referring to FIG. 10, which shows modifications to the embodiment in FIG. 4 to make it an embodiment of FM modulated Doppler group radar. The subsystem shown in FIG. 10 will replace corresponding subsystem of elements 110, 120, and 130 in FIG. 4, and keep all the rest in FIG. 4 as they were. In FIG. 10, the antenna 130 is identical to that in FIG. 4. Radio receiver 320 however not only outputs a frequency reference signal 301 as in FIG. 4 but also a precise timing indicating signal 303. The timing signal 303 may consists of a time marking pulse whose edge (e.g. rising edge) marks beginning of a predetermined time interval. The timing signal 303 may further consists of an n-bit time counter value (e.g., a time counter value associated with GPS time). The timing may be derived from GNSS signals as known in the art, or may be derived from ground station signal(s) of Standard frequency and time signal service (SFTS) as defined in Article 1.53 of the International Telecommunication Union's (ITU) Radio Regulations (RR), or space station signals of Standard frequency and time signal-satellite service (SFTSS) as defined in Article 1.54 of ITU RR, or derived from other suitable broadcasted signals, including reference signals from reference broadcast stations built specifically for this purpose. Based on the precise reference frequency and timing signals 301 and 303, the frequency synthesizer 310 will produce a FM modulated output signal and makes sure every member device in the Doppler group radar cluster reproduces this FM modulated signal exactly identically in their instantaneous frequency at any time. Such frequency synthesis technology is known in the art, e.g., those based on DDS (direct digital synthesis), and is not explained in further detail herein. In some applications, it may be desirable to alternate over time between sending FM signal and CW signal, and such arrangement may also be time-synchronized among all member devices in cluster precisely, by following a commonly agreed protocol. For example, when the timing signal 303 ticks, start sending signal configuration A if the time counter value of signal 303 or a system timing counter (not shown in drawing) is a odd number, and sending signal configuration B if the counter is an even number, and so on. As will be appreciated by people skilled in the art, the transmitting signal may be frequency modulated in sawtooth wave, triangle wave, sine wave or other types of waveforms, per application requirements.

Figure 11:
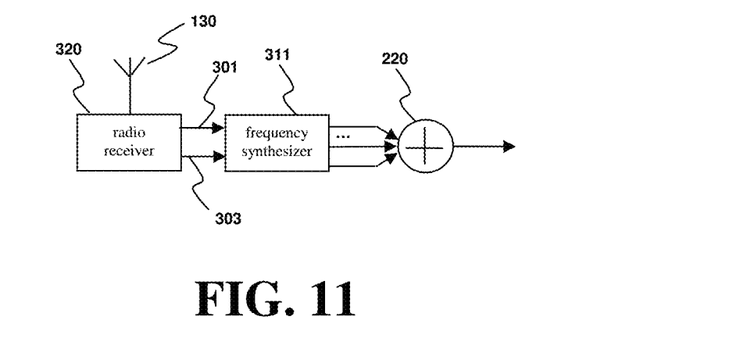
FIG. 11 shows modifications to the embodiments in FIGS. 5, 6, 8A and 8B to make them embodiments of FM modulated Doppler group radar system or subsystems thereof.

Referring to FIG. 11, which shows modifications to the embodiments in FIGS. 5, 6, 8A and 8B to make them embodiments of FM modulated Doppler group radar systems. The subsystem shown in FIG. 11 will replace corresponding subsystem of elements 120, 130, 210 and 220 in FIGS. 5, 6, 8A and 8B, and keep all the rest in FIGS. 5, 6, 8A and 8B as they were, no matter in a radar wave transmitter, receiver, active beacon, or an illuminator. The subsystem in FIG. 11 works in same way as the one in FIG. 10 except that, frequency synthesizer 311 generates more than one signals, and at least one of the signals is FM modulated at least over some time intervals. Again, in all devices of the group radar cluster, all (active) signals from any instances of the frequency synthesizers 311 in devices of the cluster are precisely time synchronized, i.e., at any time instant, the instantaneous frequency is identical between any two corresponding signals of any two devices in the cluster. Other feathers are same as described for FIG. 10 and will not be repeated herein.

Figure 12:
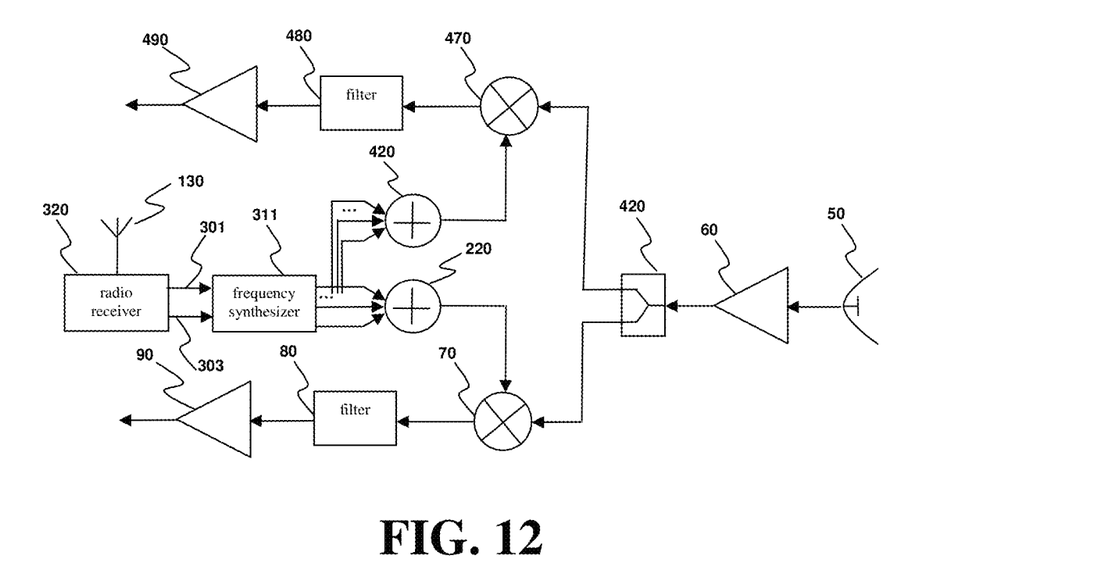
FIG. 12 illustrates a variant embodiment of FIG. 11 and FIG. 8B that separately detects the CW tone(s) and FM modulated tone(s)

In some embodiments, not all tones are FM modulated. In a radar receiver, it may be desirable to separately detect the CW tone(s) and FM modulated tone(s). As an example, FIG. 12 shows a variant embodiment of FIG. 11 and FIG. 8B that separately detects CW tone(s) and FM modulated tone(s). In FIG. 12, the generated CW tones from frequency synthesizer 311 are fed to combiner 220 as did in FIG. 8B (if only one tone is CW tone, combiner 220 is not required), but all rest FM modulated tones are fed to another combiner 420 (if only one tone is FM modulated tone, combiner 420 is not required). The combined signal of CW tones is fed to mixer 70 as did in FIG. 8B, but the combined signal of FM modulated tones is fed to a separate mixer 470. Received signal from antenna 50 after amplified and filtered by tuning amplifier 60 is split into two branches by splitter 420 and the outputs are fed to the mixers 70 and 470. Functions of filter 480 and amplifier 490 are same as their counterparts 80 and 90, respectively. The output signal from amplifier 90 is baseband signal from CW tones and that from amplifier 490 is baseband signals from FM modulated tones, they may be passed to an analog to digital converter and DSP module (both not shown in drawing) for further processing. Similarly, people skilled in the art understand that embodiments in FIG. 5 and FIG. 6 may also be implemented as described in FIG. 12 to separately mixing CW tone(s) and FM tone(s), and will not be repeatedly described herein.

Figure 13:
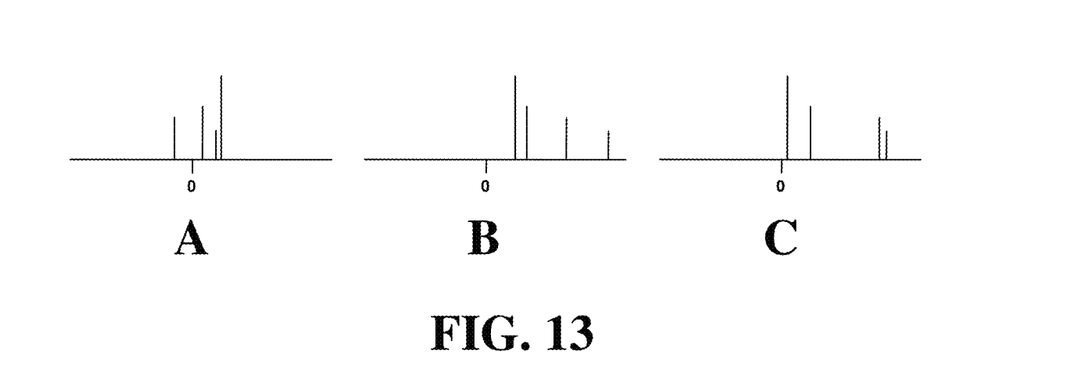

How does a FM Doppler group radar system detect both speed and range (distance)? This paragraph assumes using the embodiments of active beacon as shown in FIG. 6 with modification shown in FIG. 11, and a variant of receiver 800 using separate mixing structure like in FIG. 12. Assuming all devices use multi-tones, and some of the tones is/are CW and some other of the tones is/are FM swept using sawtooth waveform at a constant sweeping rate of $\Delta f$ Hz/second increasing for T seconds then jumps back by amount ($\Delta f \cdot T$) Hz. At any time instant, all beacons under detection in the cluster as well as all radar receivers are generating exactly same frequency in producing the transmitting signals as well as local oscillator signals fed into mixers (70, 470). Assume arbitrary number of objects are moving around a radar receiver in cluster, each carrying an active beacon as described. The CW tone(s) transmitted by a beacon seen at the radar receiver will exhibit a Doppler shift dependent on the beacon speed relative to the radar receiver. Multiple beacons will be detected as Doppler shift lines in spectrum analysis results, e.g., through FFT (Fast Fourier transform). FIG. 13A gives an example of Doppler shifts of four beacons. Each line represents a beacon and its associated object, the lines with positive frequency shifts represent objects getting closer to the radar receiver and negative frequency shifts represent objects getting farther to the radar receiver. The height of the lines represents received signal strength from a beacon. From the frequency shifts, object speeds relative to the receiver can be calculated. Next, we need to detect the range (distance) of the beacon installed objects. The FM swept tone(s) arriving at receiver antenna is delayed due to wave propagation. The FM swept tone(s) of a beacon with distance d away from the receiver will take d/c seconds to arrive at the receiver antenna, where c is the propagation speed of wave. In other words, locally generated LO (local oscillator) signal, although exactly identical to the beacon signal in frequency at any time, is actually mixing with beacon signal tone(s) generated d/c seconds ago. Due to sweeping, the instantaneous frequencies between them has shifted by $\Delta f \cdot d/c$ Hz, furthermore, due to beacon installed objects and/or the receiver may be moving, in addition to the shifting amount caused by sweeping and propagation delay, they also added amount of Doppler shifts. Spectrum analysis of the radar receiver output may display a spectrum like FIG. 13B. This is an intermediate result that contains both range (distance) and speed information, for purpose of method illustration only. We need to deduct the amount of Doppler frequency shift to get the net shift caused by signal propagation delay and FM sweeping, i.e., to deduct the CW signal detected Doppler shift (of corresponding beacon). Among the multiple lines in FIGS. 13 A and B, we need to correctly identify which line in FIG. 13A and in FIG. 13 B corresponds to a given beacon. Various methods can accomplish this task, some examples will be discussed next. Assuming we correctly identified them one by one, then deducts the Doppler caused shifts, we can get range (distance) caused shifts shown, by way of example, in FIG. 13 C, in which, the horizon axis value of lines represent the ranges (distances) of the beacons to the receiver. Combining the results from FIGS. 13 A and C, the FM modulated Doppler group radar is able to detect and report both relative speeds and distances of multiple beacon installed objects.

As discussed, we need to deduct Doppler amount of individual beacon signal, from spectrum analysis. How can we identify each spectrum lines in CW baseband and FM modulated baseband and associate them correctly for each of the detected objects? One way is by strength. When not experiencing multipath effects, since CW tone(s) and FM modulated tone(s) from a given beacon are close in frequency, and coming from same transmitter, received by same antenna and amplifier, mixer and its downstream path components may also be designed with nearly same gain, spectrum lines from CW tone(s) and FM tone(s) from a same beacon should be detected at nearly equal strengths, but spectrum lines from different beacons would vary in their strengths, depending on factors such as distance, effective radiated transmitted power in receiver direction, receiver antenna beam pattern in beacon direction. Most cases they are easy to identify and distinguish. However, it is still possible that two beacons are detected at same strength and cannot uniquely detect their speeds and distances. One way to make the identification easier is to let beacons add random (random between beacons) low frequency amplitude modulation (but identical to all CW and FM tones in same beacon). This way, the pair of spectrum lines respectively detected in CW baseband path and FM baseband path that always vary their strengths in a same way (statistically strong correlation) must come from a same beacon. Another way is to change receiver antenna beam orientation, so that objects at different directions will be affected by beam steering differently. Signals from a same beacon will change strength in same way during beam steering. Other methods are also possible.

Figure 14:
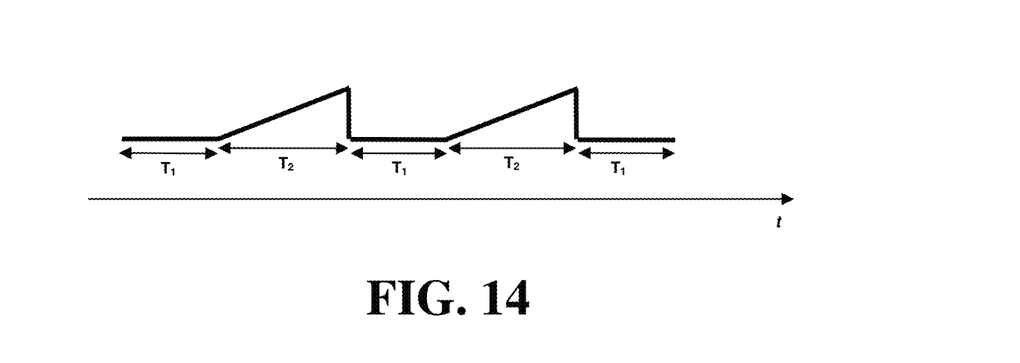
FIG. 14 shows an exemplary frequency sweeping waveform that alternating between CW and frequency ramp.

If using single tone only in the beacon embodiment of FIG. 6 (modified with FIG. 10), how can we use FM modulation to detect both speeds and range (distance) in a group radar cluster? One way to achieve this is to alternate over time CW and sawtooth frequency sweep, for example, to use tone frequency that varies as shown in FIG. 14. For an interval $T_1$ the synthesizer generates CW signal, and then for an interval of $T_2$ the frequency stats to ramp at a constant rate of $\Delta f$ Hz/second, then jumps back to the CW frequency for another interval $T_1$, and ramp again as for an interval of $T_2$ and repeats on. All devices in a cluster are synchronized to repeat the frequency cycle. During a CW interval, Doppler shifts of target beacons are measured, which obtains relative moving speeds between the receiver and each of the target beacons in cluster; during the ramping intervals frequency shifts caused by propagation delay and frequency sweep plus their Doppler shifts are measured for the target beacons, then this measured frequency shifts are deducted by their Doppler shift value individually for each beacon, obtaining the net shifts caused propagation delay and frequency sweep, their range (distance) can be calculated. Again, in the process, pairs of spectrum lines between the two intervals need to be correctly identified to detect correct amount of Doppler shift. In this process, lines maintaining same magnitude before and after a frequency jump are from a same beacon. If no two lines showing same strength at the moment of frequency jump, there is no ambiguity to find solutions. To reduce chances of ambiguous solutions, similar to the method described in previous paragraph, random (between beacons) low frequency amplitude modulation may be added to beacon transmitting signals (although random over time, maintaining constant for $T_1+T_2$, across the jump points) and if at one frequency jump still there is ambiguity, wait for another cycle to identify again. Drawback of using single tone signal is, the Doppler deducted during ramp actually is from the other time period, if object speed changes quickly during this period, will introduce some error due to the misalignment.

Figure 15:
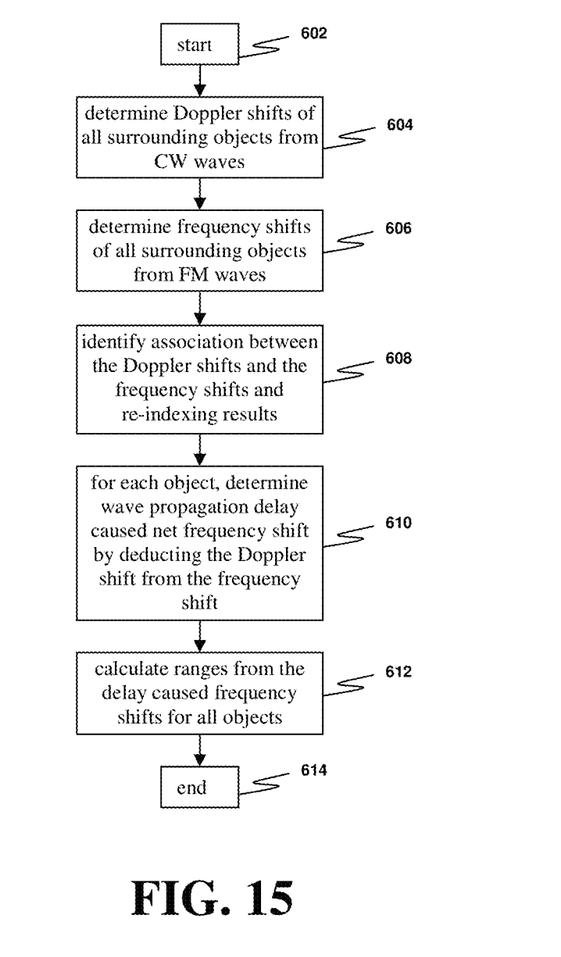
FIG. 15 is a flowchart showing the steps to determine both ranges (distances) and relative speeds of objects using Doppler group radar system with beacon and combined CW and FM wave signal.

FIG. 15 is a flowchart summaries the steps to determine both ranges (distances) and relative speeds of objects using Doppler group radar system with beacon and combined CW and FM wave signal, as discussed in previous paragraphs. Beginning from step 602; first, from mixing product signals of CW tone(s) and received wave signals, at step 604, a group radar receiver is able to determine a first array containing Doppler shifts for objects detected; next, from mixing product signals of FM swept tone(s) and received wave signals, at step 606, the receiver is able to determine a second array of frequency shifts for the objects, note however, the array elements for the first array and the second array may not be indexed by corresponding objects; next at step 608, the association the two array elements need to be identified, for example, using methods described in previous paragraphs, or by other methods, and the array indexes are rearranged to make correct object association between first array and rearranged second array; at step 610, the (rearranged) second array minus the first array element by element, obtain a third array that contains net frequency shifts caused by wave propagation delay of objects. From this third array, we can calculate ranges (distances) of objects (step 612), so the first and the third arrays provide both relative speed and distance of detected objects, the task ends at step 614.

With the above describe examples, people of ordinary skill in the art would be able to work out detection methods for group users/objects for other embodiments of CW and/or FM Doppler group radar systems, such as those in FIG. 4, FIG. 5, FIG. 6 (may be mixed with non-beacon objects), as well as FIGS. 8 A and B, as modified according to FIG. 9 or 10, or FIG. 12, with or without beacon, with or without illuminator, with radar devices being quasi stationary or moving, mixed device types, etc. Since the use cases are application dependent and there exist a lot of combinations, elaborating all cases is not necessary. Furthermore, detection methods and processing algorithms are not unique, people of ordinary skill in the art would be able to work out variations and proprietary algorithms.

Certain terms are used to refer to particular components. As one skilled in the art will appreciate, people may refer to a component by different names. It is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

Also, the term "couple" in any form is intended to mean either a direct or indirect connection through other devices and connections.

It should be understood that various modifications can be made to the embodiments described and illustrated herein, without departing from the invention, the scope of which is defined in the appended claims.

I claim:

1. A System of Doppler group radar, Doppler group sonar or wave based Doppler group sensor for sensing objects, comprising:
   at least one radio receiver, configured to receive at least one broadcasted signal and based on said broadcasted signal to generate at least one of a frequency reference signal and a timing signal;
   at least one signal generator, each coupled to one of the at least one radio receiver, configured to generate at least one of a first signal and a second signal based on at least one of the frequency reference signal and the timing signal;
   at least one wave transmitter, each coupled to one of the at least one signal generator, configured to transmit one of the first signal, the second signal, or a linear combination of the first and the second signals as wave for object sensing; and
   at least one wave receiver, each coupled to one of the at least one signal generator, configured to receive waves associated with objects under detection, convert said waves into a wave signal, mix the wave signal with at least one local replica signal based on said first signal, said second signal, or a linear combination of said first and second signals, and provide at least one mixing product signal for further processing;
   whereby, when in the system there exist a plurality of signal generators of said at least one signal generators, said plurality of signal generators are configured to generate:
      multiple copies of the first signals substantially identical to each other in frequency properties between any pair thereof, whenever and wherever said first signal is actively generated; and
      multiple copies of the second signals substantially identical to each other in frequency properties between any pair thereof, whenever and wherever said second signal is actively generated.

2. The System of Doppler group radar, Doppler group sonar or wave based Doppler group sensor of claim 1, wherein the broadcasted signal is at least one of:
   a Global Navigation Satellite System (GNSS) signal;
   a GPS signal;
   a GLONASS signal;
   a Beidou signal;
   a Galileo signal;
   a standard frequency and time signal service (SFTS) signal;
   a standard frequency and time signal-satellite service (SFTSS) signal;
   a wireless signal that is locked in frequency to a GNSS signal; and
   a wireless signal that is commonly available to all of the at last one radio receivers in the system.

3. The System of Doppler group radar, Doppler group sonar or wave based Doppler group sensor of claim 1, wherein the at least one signal generator includes a frequency synthesizer.

4. The System of Doppler group radar, Doppler group sonar or wave based Doppler group sensor of claim 1, wherein the first signal is at least one of:
   a continuous wave (CW) signal;
   a CW signal that is gated on and off over time; and
   a linear combination of a plurality of CW signals at distinct frequencies.

5. The System of Doppler group radar, Doppler group sonar or wave based Doppler group sensor of claim 1, wherein the second signal is at least one of:
   a frequency modulated signal; and
   a linear combination of a plurality of frequency modulated signals at distinct carrier frequencies.

6. The System of Doppler group radar, Doppler group sonar or wave based Doppler group sensor of claim 1, wherein said linear combination of the first and the second signals includes linear combination coefficients that are time varying.

7. The System of Doppler group radar, Doppler group sonar or wave based Doppler group sensor of claim 5, wherein the plurality of frequency modulated signals maintain one of the following quantities a constant or constants:
   a difference or differences of instantaneous frequencies between any pair thereof; or
   a ratio or ratios of instantaneous frequencies between any pair thereof.

8. The System of Doppler group radar, Doppler group sonar or wave based Doppler group sensor of claim 1, wherein the at least one local replica signal includes the first signal, the second signal, and the linear combination of the first and the second signals.

9. The System of Doppler group radar, Doppler group sonar or wave based Doppler group sensor of claim 1, wherein at least one of the at least one wave transmitter functions as an active beacon transmitter, and is attached to an object to be detected by said at least one wave receiver physically located away from this instance of the active beacon transmitter.

10. The System of Doppler group radar, Doppler group sonar or wave based Doppler group sensor of claim 1, wherein at least one of the at least one wave transmitter is configured to functions as an illuminator transmitter, and to be operable to transmit one of the first signal, the second signal, or a linear combination of the first and the second signals as wave towards objects to be sensed.

11. The System of Doppler group radar, Doppler group sonar or wave based Doppler group sensor of claim 10, wherein the illuminator transmitter is installed on at least one of:
   a stationary platform; or
   a movable reference platform.

12. A wave receiver apparatus for sensing objects in a system of Doppler group radar, Doppler group sonar or wave based Doppler group sensor, comprising:
   a radio receiver, configured to lock to a broadcasted signal from an antenna, and derive, from the broadcasted signal, at least one of a frequency reference signal and a timing signal;
   a signal generator, coupled with the radio receiver, configured to generate, based on the at least one of the frequency reference signal and the timing signal, at least one of a first signal and a second signal;

one of a wave antenna or a wave transducer, configured to receive waves associated with objects under sensing and convert the waves into a wave signal;

a receiver frontend, coupled with the one of the wave antenna or the wave transducer, configured to amplify and filter the wave signal, and provide a frontend output signal;

a least one mixer, coupled with the receiver frontend and the signal generator, configured to mix the frontend output signal with at least one of the first signal, the second signal and a linear combination of the first and the second signals, and produce at least one mixing product signals for further processing; and whereby the wave receiver apparatus is configured to generate and use, at any time instant of operation, said at least one of the first signal and the second signal substantially identical in frequency properties with a counterpart thereof generated elsewhere in other devices within the system of Doppler group radar, Doppler group sonar or wave based Doppler group sensor.

13. The wave receiver apparatus of claim 12 is at least one of:
a stand alone device operable in said system; and
a functional subsystem in a device of combined functions in said system.

14. The wave receiver apparatus of claim 12 further includes a least one of:
at least one filter, coupled with the at least one mixer, configured to selectively block frequency components in channel not of application concerns;
at least one amplifier, coupled with the at least one filter and the at least one mixer, configured to amplify signals in baseband; and
at least one analog to digital converter, coupled with the at least one amplifier and the at least one filter, configured to digitize signals in baseband channel; and
a digital signal processor, coupled to the analog to digital converter, configured to process the baseband signal and obtaining wanted sensing results.

15. A transmitter apparatus in a system of Doppler group radar, Doppler group sonar or wave based Doppler group sensor, comprising:
a radio receiver, configured to lock to a broadcasted signal from an antenna, and derive, from the broadcasted signal, at least one of a frequency reference signal and a timing signal;
a signal generator, coupled with the radio receiver, configured to generate, based on the at least one of the frequency reference signal and the timing signal, at least one of a first signal and a second signal, and build a transmitting signal based on said at least one of the first signal and the second signal;
one of a wave antenna or a wave transducer, coupled with the signal generator, configured to convert the transmitting signal into waves and send the waves into propagation media of waves;
whereby the transmitter apparatus is configured to generate and use, at any time instant of operation, said at least one of the first signal and the second signal substantially identical in frequency properties with a counterpart thereof generated elsewhere in other devices within the system of Doppler group radar, Doppler group sonar or wave based Doppler group sensor.

16. The transmitter apparatus of claim 15 is at least one of:
a stand alone device operable in said system; and
a functional subsystem in a device of combined functions in said system.

17. The transmitter apparatus of claim 16 is at least one of
an active beacon apparatus operable in said system and attached to an object being sensed by said system; and
an illuminator apparatus operable in said system.

18. The illuminator apparatus of claim 17 is installed on at least one of a stationary platform; and
a movable reference platform.

19. The transmitter apparatus of claim 15 further includes an amplifier, coupled with the signal generator and said one of a wave antenna or a wave transducer.

20. A method of determining relative speeds and ranges (distances) of beacon-attached objects using Doppler group sensor system, comprising steps, performed in a wave receiver, of:
determining, from CW waves, Doppler shifts of beacon-attached objects;
determining, from FM swept waves, frequency shifts of the beacon-attached objects;
identifying, based on magnitude correlation, object association between the Doppler shifts and the frequency shifts of the beacon-attached objects;
determining, by deducting the Doppler shift results from the frequency shift results, net frequency shifts caused by wave propagation delay; and
calculating, based on the net frequency shifts caused by wave propagation delay, the ranges of the beacon-attached objects;
wherein, the wave receiver and the beacons are substantially synchronized apparatuses in the Doppler group sensor system.

* * * * *